Figure 1:
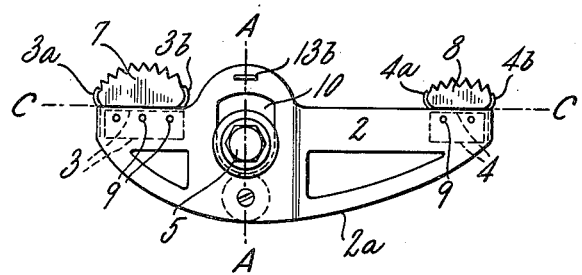

Feb. 20, 1951     E. MATTHIAS ET AL     2,542,548

PEDAL ON A CRANK DRIVE, ESPECIALLY FOR BICYCLES

Filed Feb. 12, 1948

INVENTORS
EUGEN MATTHIAS
ALOIS UTIGER
BY
*Leon M. Strauss*
AGT.

Patented Feb. 20, 1951

2,542,548

UNITED STATES PATENT OFFICE 2,542,548

PEDAL ON A CRANK DRIVE, ESPECIALLY FOR BICYCLES

Eugen Matthias, Zurich, and Alois Utiger, Lucerne, Switzerland

Application February 12, 1948, Serial No. 7,774
In Switzerland August 24, 1943

8 Claims. (Cl. 74—594.4)

The invention relates to a pedal mechanism for use on a crank shaft or pin, especially of bicycles, which pedal mechanism mainly consists of a lever of the first order with arms of unequal lengths and journalled on the crank pin, said lever being further provided with a rear foot rest at the end of the long lever arm and with a front foot rest at the end of the short lever arm.

An important feature of the invention resides further in the provision of means affording automatic horizontal adjustment of the pedal before use.

Further characteristics of the invention will be apparent from the description and the drawing showing a preferred embodiment of a pedal mechanism embodying the invention.

Figure 2:
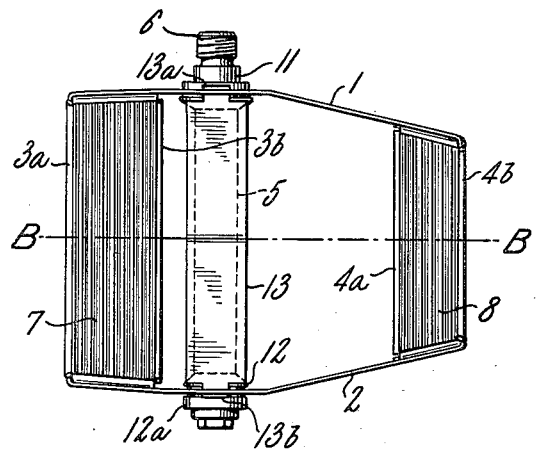

In the drawing:

Fig. 1 is a side elevation of the pedal,

Fig. 2 a top plan view thereof, whereas

Figure 3:
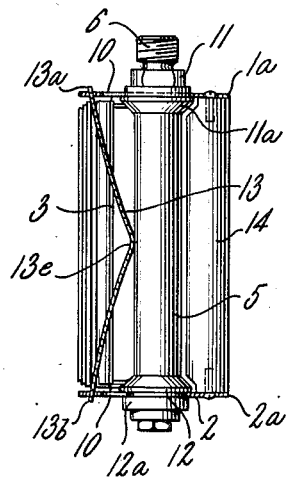

Fig. 3 is a sectional view taken along line A—A of Fig. 1.

In accordance with the embodiment shown the pedal consists of a frame 1, 2, 3 and 4, bridge member or bushing 5 by means of which the frame is journalled on the crank pin 6. The bushing or bridge member 5 together with the frame 1, 2, 3, 4 is journalled to the crank pin 6, the frame, however, being spring supported and shiftable relative to the bushing 5 and therefore relative to the crank pin 6 too, in such a way as described hereafter.

The frame which forms the pedal proper consists of a lever of the first order having the side plates 1 and 2 which carry a pad 7 for the front portion of the foot and another pad 8 for the rear portion of same, whereby the lever arm with the front foot pad 7 is shorter than the lever arm with the rear foot pad 8 is. The side plates 1 and 2 are interconnected by the stays 3 and 4, which are riveted to said side plates at 9 to form a rigid structure. These stays 3 and 4 form also supports for the rubber pads 7 and 8 for contact with the front and the rear portions of the foot, respectively. To this end, the stays 3 and 4 have along their longitudinal edges upwardly bent extensions 3a, 3b, 4a and 4b between which edges the fluted rubber blocs 7 and 8 are inserted and pressed. The rubber blocs 7 and 8 are convexly curved in the direction of the upper surfaces.

Each of the side plates 1 and 2 has a slot 10 extending at right angles relative to the longitudinal plane C—C of the pedal (Fig. 1). By means of these slots 10 the frame 1—4 is movably guided with regard to the pedal axle in the following way:

The bushing 5 has at each end two sleeves 11, 11a, 12, 12a between which the side plates 1, 2 of the pedal frame are arranged with a certain play. The frame, therefore, can be somewhat displaced along the slots 10 and also rocked around the central longitudinal axis B—B (Fig. 2) owing to said play. This displacement and rocking movement takes place in a manner of a stability polygon due to a springing device. This device consists of a V-shaped plate spring 13, which engages with its ends 13a, 13b corresponding slots provided in the side plates 1 and 2 and rests with its vertex portion 13e (Fig. 3) on the bushing 5. The plate spring 13, therefore, urges the frame 1—4 into its upper end position relative to the bushing 5, i. e. the crank pin 6 (Figs. 2 and 3). The centre of gravity of the pedal journalled on the crank pin is located below the axis of rotation, thus urging the pedal to an approximately horizontal position when not in use or unloaded. If, when driving the heel of the driver's foot rests on the heel support 8 and the front portion of the shoe on the rubber pad 7, the ankle-joint will become less tired than when driving or operating conventional pedals. The side plates 1 and 2 may have stiffening strips or struts 1a, 2a curving downward to which a weight in the form of a staying bolt 14 is fixed so as to locate the pedal's centre of gravity right below the crank pin axle.

Owing to the design of the pedal according to the invention, essentially the following advantages are accomplished, viz.:

An utmost simple pedal has been produced, especially for bicycles which, owing to the location of the centre of gravity below the pedal axle automatically adjusts itself to an approximately horizontal position when inoperative or not in use, i. e. to a position ready for driving.

Owing to the resiliency or spring support 13 of the pedal frame relative to the pedal axle agreeable and gentle resting of the foot is secured and the whole supporting surface of the pedal always fully adjusts itself to the sole of the foot, i. e. the shoe due to the possibility of a springy rocking movement within certain limits.

Owing to the curved form of rubber pads used adaption of the bearing surface to different sizes of shoes and heights of heels and also to varying distances between the sole of the shoe and the heel thereof is considerably simplified and improved.

Having thus described the invention, what is claimed as new and desired to be secured by Letters Patent, is:

1. A pedal mechanism for connection with the crank pin of bicycles and similar vehicles comprising a pair of parallel frame members, spaced apart stays extending crosswise to said frame members and fixed thereto to thereby form a unitary double-armed lever, said frame members being provided with aligned slots for pivotal connection of said lever with said crank pin and dividing said lever into a short forward arm portion and a relatively long rearward arm portion, and weight means extending between said frame members and below said slots, whereby the center of gravity of said double-armed lever is located below the longitudinal axis of said crank pin.

2. A pedal mechanism according to claim 1, including convexly shaped rubber blocks extending beyond said parallel frame members and supported by said stays.

3. A pedal mechanism according to claim 1, wherein said parallel frame members are provided with downwardly curved struts extending from one end of each frame member to the opposite end of said frame member, and means securing said weight means below said slots and substantially parallel with the horizontal axis of said crank pin.

4. A pedal mechanism according to claim 3, including extensions projecting beyond said frame members for embracing said rubber blocks.

5. A pedal mechanism for connection with the crank pin of bicycles and like vehicles, comprising two elongated side frame members, cross pieces spaced from each other and fixedly connecting said side frame members together, each side frame member being provided with a slot for guidingly supporting said side frame members on said crank pin, said slots being aligned with each other and disposed with respect to said side frame members so as to form a double-armed lever in assembled condition with respect to said crank pin, said double-armed lever having a forward and shoe sole supporting portion and a rearward and heel engaging portion, the length of said forward portion being shorter than that of said rearward portion, and crosswise extending means between said side frame members and located below the slots of the latter, whereby the center of gravity of said double-armed lever is situated below the longitudinal axis of said crank pin in said assembled condition.

6. A pedal mechanism according to claim 5, wherein said side frame members of said double-armed lever converge from adjacent said slots toward the rearward portion of said lever.

7. A pedal mechanism according to claim 5, including rubber blocks mounted on and coextensive with said cross pieces.

8. A pedal mechanism according to claim 5, including a bushing arranged for co-axial position with said crank pin, and V-shaped spring means bearing on said bushing, said spring means having free ends for position on said side frame members, respectively.

EUGEN MATTHIAS.
ALOIS UTIGER.

REFERENCES CITED

The following references are of record in the file of this patent:

UNITED STATES PATENTS

| Number | Name | Date |
| --- | --- | --- |
| 581,095 | Willard | Apr. 20, 1897 |
| 2,024,499 | Baron | Dec. 17, 1935 |

FOREIGN PATENTS

| Number | Country | Date |
| --- | --- | --- |
| 16,124 | Great Britain | 1896 |
| 19,952 | Great Britain | Nov. 25, 1893 |